(12) United States Patent
Tsai et al.

(10) Patent No.: US 8,275,752 B2
(45) Date of Patent: Sep. 25, 2012

(54) DATA BACKUP METHOD THROUGH DISTRIBUTED NETWORK, INVOLVES GENERATING DATA SEGMENT COPIES TO TRANSMIT TO PEER STORAGE SERVERS BASED ON METADATA WITH SEGMENT DISTRIBUTION MATRIX BY CALCULATING REDUNDANCY CORRESPONDING TO DATA SEGMENTS

(75) Inventors: Chia-Ying Tsai, Tainan County (TW); Chun-Yu Wang, Taichung County (TW); Chung-Chieh Hsu, Tainan (TW); Hsu-Cheng Lin, Kaohsiung (TW); Yi-Chang Zhuang, Kaohsiung (TW)

(73) Assignee: Industrual Technology Resesarch Institute, Hsinchu (TW)

( * ) Notice: Subject to any disclaimer, the term of this patent is extended or adjusted under 35 U.S.C. 154(b) by 50 days.

(21) Appl. No.: 12/869,758

(22) Filed: Aug. 27, 2010

(65) Prior Publication Data

US 2012/0005165 A1 Jan. 5, 2012

(30) Foreign Application Priority Data

Jun. 30, 2010 (TW) .............................. 99121473 A

(51) Int. Cl.
*G06F 17/30* (2006.01)
(52) U.S. Cl. ........................ 707/661; 707/827; 711/162
(58) Field of Classification Search .................. 707/661, 707/827; 714/19; 711/162
See application file for complete search history.

(56) References Cited

U.S. PATENT DOCUMENTS

| 7,529,834 | B1 | 5/2009 | Birrell et al. |
| 7,596,570 | B1* | 9/2009 | Emigh et al. ........................... 1/1 |
| 2001/0056425 | A1* | 12/2001 | Richard ........................ 707/10 |
| 2003/0046260 | A1* | 3/2003 | Satyanarayanan et al. ....... 707/1 |
| 2004/0059747 | A1* | 3/2004 | Olarig et al. ................... 707/102 |
| 2008/0133445 | A1 | 6/2008 | Pennington |
| 2009/0254572 | A1* | 10/2009 | Redlich et al. .................. 707/10 |
| 2009/0313503 | A1* | 12/2009 | Atluri et al. ..................... 714/19 |
| 2009/0327244 | A1 | 12/2009 | Rizal |
| 2010/0250497 | A1* | 9/2010 | Redlich et al. ................ 707/661 |
| 2012/0005165 | A1* | 1/2012 | Tsai et al. ..................... 707/652 |

* cited by examiner

*Primary Examiner* — Jean M Corrielus
(74) *Attorney, Agent, or Firm* — Jianq Chyun IP Office

(57) ABSTRACT

Distributed network-based data backup, recovery and deletion methods and a distributed network system thereof are provided. The methods include respectively establishing peer-to-peer connections between a host storage server and a plurality of peer storage servers, dividing original data into a plurality of data segments, generating a plurality of data segment copies corresponding to the data segments according to a minimum survival rate and the number of peer storage servers. The methods also include transmitting the data segment copies to the peer storage servers, wherein the number of data segment copies for each of the data segments is equal to a redundancy, and the redundancy is smaller than the number of the peer storage servers, and the data segment copies distributed to any one of the peer storage servers correspond to a portion of all the data segments. Accordingly, the methods can effectively and safely backup the original data.

30 Claims, 9 Drawing Sheets

| Storage server / Data segment | 104 | 106 | 108 | 110 | 112 | 114 |
|---|---|---|---|---|---|---|
| P1 | P1(1) | P1(2) | P1(3) | P1(4) | | |
| P2 | | P2(1) | P2(2) | P2(3) | P2(4) | |
| P3 | | | P3(1) | P3(2) | P3(3) | P3(4) |
| P4 | P4(4) | | | P4(1) | P4(2) | P4(3) |
| P5 | P5(3) | P5(4) | | | P5(1) | P5(2) |
| P6 | P6(2) | P6(3) | P6(4) | | | P6(1) |
| P7 | P7(1) | P7(2) | P7(3) | P7(4) | | |
| P8 | | P8(1) | P8(2) | P8(3) | P8(4) | |
| P9 | | | P9(1) | P9(2) | P9(3) | P9(4) |
| P10 | P10(4) | | | P10(1) | P10(2) | P10(3) |
| P11 | P11(3) | P11(4) | | | P11(1) | P11(2) |
| P12 | P12(2) | P12(3) | P12(4) | | | P12(1) |

DATA BACKUP METHOD THROUGH DISTRIBUTED NETWORK, INVOLVES GENERATING DATA SEGMENT COPIES TO TRANSMIT TO PEER STORAGE SERVERS BASED ON METADATA WITH SEGMENT DISTRIBUTION MATRIX BY CALCULATING REDUNDANCY CORRESPONDING TO DATA SEGMENTS

CROSS-REFERENCE TO RELATED APPLICATION

This application claims the priority benefit of Taiwan application serial no. 99121473, filed on Jun. 30, 2010. The entirety of the above-mentioned patent application is hereby incorporated by reference herein and made a part of this specification.

BACKGROUND

1. Field of the Disclosure

The disclosure relates to data backup, recovery and deletion methods through a distributed network and a system thereof.

2. Description of Related Art

Along with a progress of storage devices, demand and method for data backup are continually updated. For example, optical discs, flash drives or portable hard disks are widely used for data backup. These storage methods have advantages of easy carriage and great storage capacity. With development of network technology, internet storage was developed to back up data regardless the real location of the storage, so as to effectively backup important data.

Presently, a plurality of network storage and backup products has been provided in the market, though most of these products are used for high-class commercial applications, and are not suitable for household applications or needs of a generally user. For example, most of the network storage and backup products are high-class commercial-used backup products, which can achieve a secure data backup, though prices of these products are relatively high, which is beyond affordability of a general user. Although some personal network attached storage (NAS) systems are provided in the market, these products can only provide a simple personal backup or share function or a simple network accessing function (for example, through a website), which has a lot of limitations in application. Moreover, hardware (for example, a memory, a hard disk, etc.) has a limited service life or unpredictable risk of damage, if original data and the corresponding backup data are all damaged, important data cannot be recovered, which may cause a huge damage to the user. In addition, transmission and backup of data through the network may cause lost and exposure of the entire data. Therefore, to construct an economic and secure network storage and backup method is one of the major subjects to those technical staff in this domain.

SUMMARY

Accordingly, the disclosure is directed to data backup, recovery, deletion methods through a distributed network and a distributed network system thereof, which can provide an economic and secure network backup mechanism.

The disclosure provides a data backup method through a distributed network, which is adapted to backup an original data stored in a host storage server by a user.

The data backup method includes establishing a plurality of peer-to-peer connections between the host storage server and a plurality of peer storage servers through a community network system, wherein the host storage server and the peer storage servers are belonged to the same storage server group in the community network system. The data backup method also includes receiving a backup request requesting backing up the original data from the user of the host storage server; dividing the original data into a plurality of data segments according to a segment size; calculating a redundancy corresponding to each of the data segments according to a minimum survival rate and the number of the peer storage servers; and generating a plurality of data segment copies corresponding to the data segments according to the number of the data segments, the number of the peer storage servers and the redundancy. The data backup method further includes distributing the data segment copies corresponding to the data segments to the peer storage servers; generating a metadata having a segment distribution matrix according to a distribution result; and transmitting the data segment copies to the peer storage servers from the host storage server according to the metadata.

The disclosure provides a data recovery method through a distributed network, which is adapted to recover an original data according to a plurality of data segment copies stored in a plurality of peer storage servers, wherein the original data has a plurality of data segments and the data segment copies are generated according to the data segments. The data recovery method includes establishing a plurality of peer-to-peer connections between a host storage server and a plurality of connected peer storage servers among the peer storage servers through a community network system; receiving a recovery request used to request recovering the original data from a user of the host storage server; and sending a data recovery request to the connected peer storage servers according to the recovery request, wherein the host storage server and the peer storage servers are belonged to the same storage server group in the community network system. The data recovery method also includes receiving a plurality of responses corresponding to the data recovery request from a plurality of responded peer storage servers among the connected peer storage servers and determining whether the data segment copies stored in the responded peer storage servers are enough to recover the original data according to the responses corresponding to the data recovery request. The data recovery method further includes, if the data segment copies stored in the responded peer storage servers are enough to recover the original data, obtaining the data segment copies stored in the responded peer storage servers and recovering the original data according to a metadata corresponding to the original data by using the obtained data segment copies.

The disclosure provides a data deletion method through a distributed network, which is adapted to delete a plurality of data segment copies corresponding to an original data from a plurality of peer storage servers, wherein the original data has a plurality of data segments, and the data segment copies are generated according to the data segments. The data deletion method includes receiving a deletion request from a user of a host storage server, wherein the deletion request is used to request deleting the data segment copies corresponding to the original data. The data deletion method also includes sending a backup data deletion request to the peer storage servers according to a metadata corresponding to the original data through a community network system, wherein the host storage server and the peer storage servers are belonged to the same storage server group in the community network system. The data deletion method still includes receiving a plurality of responses corresponding to the backup data deletion request from the peer storage servers and determining whether the data segment copies stored in all of the peer storage servers are deleted according to the responses corresponding to the backup data deletion request. The data deletion method further includes, deleting the metadata corresponding to the original data if the data segment copies stored in all of the peer storage servers are deleted.

The disclosure provides a distributed network system, which includes a community network system, a plurality of peer storage servers and a host storage server, wherein the host storage server and the peer storage servers are belonged to the same storage server group in the community network system. The host storage server receives a backup request used to backup an original data, and establishes a plurality of peer-to-peer connections between the host storage server and the peer storage servers through the community network system. Moreover, the host storage server divides the original data into a plurality of data segments according to a segment size, calculates a redundancy corresponding to each of the data segments according to a minimum survival rate and the number of the peer storage servers, generates a plurality of data segment copies corresponding to the data segments according to the number of the data segments, the number of the peer storage servers and the redundancy, distributes the data segment copies corresponding to the data segments to the peer storage servers and generates a metadata having a segment distribution matrix according to a distribution result. Moreover, the host storage server transmits the data segment copies to the peer storage servers according to the metadata.

The disclosure provides a distributed network system, which includes a community network system, a plurality of peer storage servers and a host storage server, wherein the peer storage servers store a plurality of data segment copies corresponding to an original data, the original data has a plurality of data segments, the data segment copies are generated according to the data segments, and the host storage server and the peer storage servers are belonged to the same storage server group in the community network system. The host storage server receives a recovery request used to request recovering the original data, establishes a plurality of peer-to-peer connections between the host storage server and a plurality of connected peer storage servers among the peer storage servers through a community network system, and sends a data recovery request to the connected peer storage servers. The host storage server receives a plurality of responses corresponding to the data recovery request from a plurality of responded peer storage servers among the connected peer storage servers, and determines whether the data segment copies stored in the responded peer storage servers are enough to recover the original data according to the responses. Moreover, if the data segment copies stored in the responded peer storage servers are enough to recover the original data, the host storage server obtains the data segment copies stored in the responded peer storage servers, and recovers the original data according to a metadata corresponding to the original data by using the obtained data segment copies.

The disclosure provides a distributed network system, which includes a community network system, a plurality of peer storage servers and a host storage server, wherein the peer storage servers store a plurality of data segment copies corresponding to an original data, the original data has a plurality of data segments, the data segment copies are generated according to the data segments, and the host storage server and the peer storage servers are belonged to the same storage server group in the community network system. The host storage server receives a deletion request, wherein the deletion request is used to request deleting the data segment copies corresponding to the original data. The host storage server sends a backup data deletion request to the peer storage servers according to a metadata corresponding to the original data through the community network system. The host storage server receives a plurality of responses corresponding to the backup data deletion request from the peer storage servers, and determines whether the data segment copies stored in all of the peer storage servers are deleted according to the responses. If the data segment copies stored in all of the peer storage servers are deleted, the host storage server deletes the metadata corresponding to the original data.

According to the above descriptions, the data backup, recovery and deletion methods and the system thereof of the disclosure can effectively increase a data recovery capability in case of a system damage, increase a security of network backup, and increase a data accessibility and a data accessing speed.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 is an example of a segment distribution matrix according to the first exemplary embodiment of the disclosure.

DETAILED DESCRIPTION OF DISCLOSED EMBODIMENTS

First Exemplary Embodiment

Figure 1:
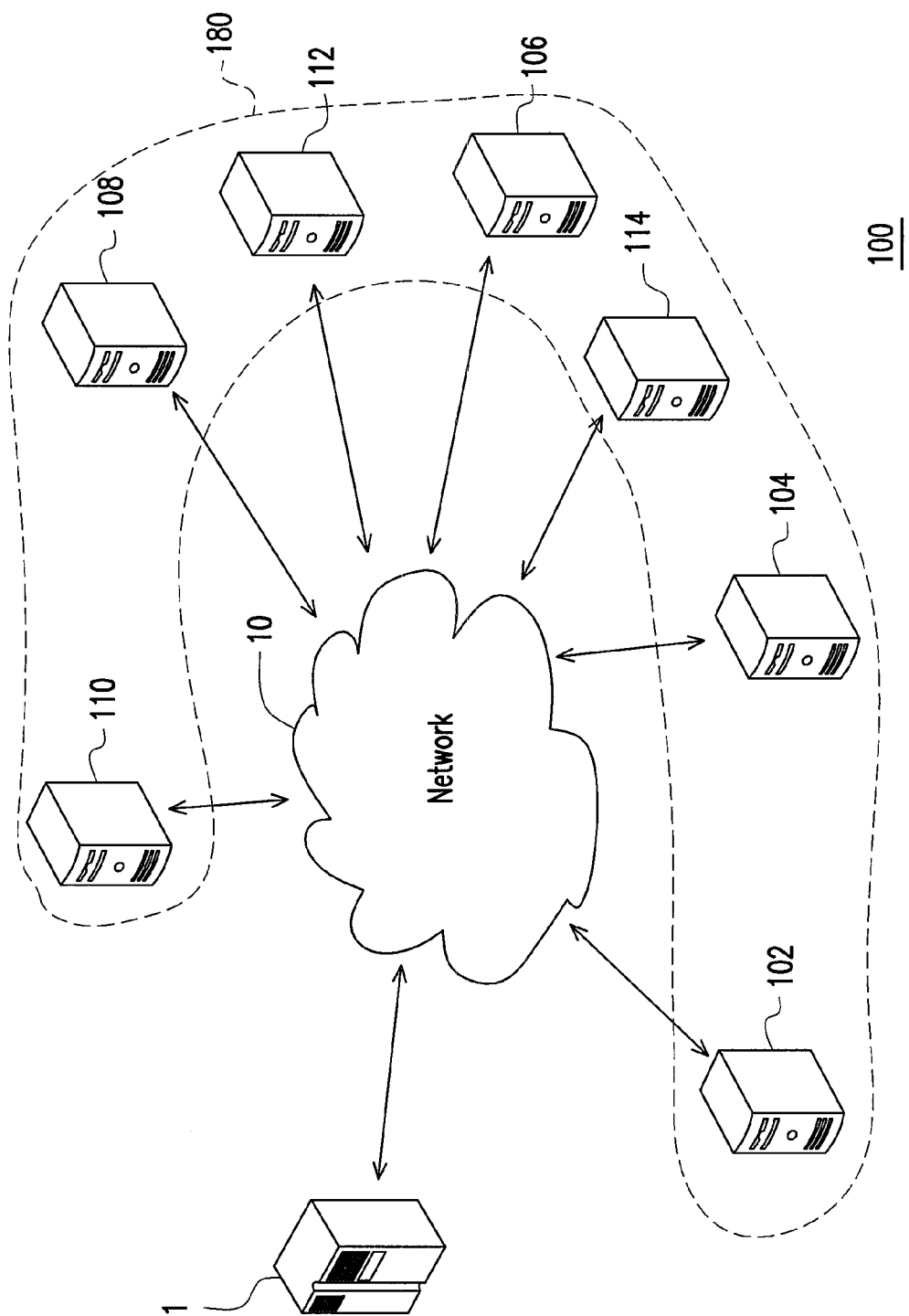
FIG. 1 is a structural diagram illustrating a distributed network system according to a first exemplary embodiment of the disclosure.

FIG. 1 is a structural diagram illustrating a distributed network system according to a first exemplary embodiment of the disclosure.

Referring to FIG. 1, the distributed network system 100 includes a community network system 1, a network 10 and storage servers 102, 104, 106, 108, 110, 112 and 114.

In the present exemplary embodiment, the storage servers 102, 104, 106, 108, 110, 112 and 114 can receive digital data from electronic devices, computers or servers connected to the network 10, or can transmit digital data to the electronic devices, computers or servers connected to the network 10. In the present exemplary embodiment, the network 10 is a network system complied with Internet protocols (IP). However, it should be noticed that the disclosure is not limited thereto, and in another exemplary embodiment of the disclosure, the network 10 can also be any other computer network.

The storage servers 102, 104, 106, 108, 110, 112 and 114 are data processing devices having data storage medium. Particularly, all of the storage servers 102, 104, 106, 108, 110, 112 and 114 have data backup, recovery and deletion functions through a distributed network, and can form a backup network through the community network system 1. For example, the storage servers 102, 104, 106, 108, 110, 112 and 114 are computers integrating file servers, multimedia sharing servers and a network community function. For example, the computer has a central processor, a memory, a storage device, a display and an output/input device. In the present exemplary embodiment, the storage servers 102, 104, 106, 108, 110, 112 and 114 are electronic devices having similar structures and functions. The storage server 102 is taken as an example for a further description.

The storage server 102 may communicate with the storage servers 104, 106, 108, 110, 112 and 114 through the network 10 and the community network system 1 constructed base on an instant messaging system. For example, an instant messaging software of the community network system 1 is installed in the storage servers 102, 104, 106, 108, 110, 112 and 114, and in the community network system 1, the storage server 102 registers the storage servers 104, 106, 108, 110, 112 and 114 in a friend list, so that the storage server 102 can perform community network services, such as information transmission, to the storage servers 104, 106, 108, 110, 112 and 114. Moreover, it should be noticed that besides the storage servers 104, 106, 108, 110, 112 and 114, the friend list of the storage server 102 may also include other computers or storage servers. In the present exemplary embodiment of the disclosure, the community network system 1 used by the storage servers 102, 104, 106, 108, 110, 112 and 114 is the Microsoft Windows Live Messenger. However, the disclosure is not limited thereto, and in another exemplary embodiment of the disclosure, Yahoo Messenger or other suitable community network systems 1 can also be used.

In the present exemplary embodiment, when the storage server 102 is connected to the community network system 1, the other storage servers (i.e., the storage servers 104, 106, 108, 110, 112 and 114) having the data backup, recovery and deletion functions through the distributed network in the friend list of the storage server 102 may form a storage server group 180 based on the storage server 102, and the storage server 102 may establish peer-to-peer connections with the storage servers having the data backup, recovery and deletion functions through the distributed network. In this way, a backup network can be constructed base on the storage server group, and operations such as data backup, recovery and deletion can be performed according to requests of the storage server 102.

For example, the storage server 102 can establish peer-to-peer connections with the storage servers 104, 106, 108, 110, 112 and 114 through the community network system 1 to form the backup network, so as to perform data backup, recovery and deletion. In detail, the storage server 102 may execute a data backup method through a distributed network of the present exemplary embodiment to divide an original data into a plurality of data segments, and dispersedly backup a plurality of data segment copies corresponding to the data segments to the storage servers 104, 106, 108, 110, 112 and 114, so that the storage servers 104, 106, 108, 110, 112 and 114 may respectively preserve a part of the data segment copies. Moreover, when the original data is lost, the storage server 102 may execute a data recovery method through a distributed network of the present exemplary embodiment to obtain the data segment copies from the storage servers 104, 106, 108, 110, 112 and 114, so as to recover the original data. Moreover, if the backup of the original data is unnecessary, the storage server 102 may execute a data deletion method through a distributed network of the present exemplary embodiment to request the storage servers 104, 106, 108, 110, 112 and 114 to delete the data segment copies stored therein.

Here, the storage server 102 requesting for data backup is referred to as a host storage server, and the storage servers 104, 106, 108 110, 112 and 114 used for storing the backup data are referred to as peer storage servers.

It should be noticed that since the storage servers 104, 106, 108 110, 112 and 114 are added into the friend list of the storage server 102 by a user of the storage server 102, when the storage servers 104, 106, 108 110, 112 and 114 serve as the peer storage servers to backup data requested by the storage server 102, the security of the data can be ensured. Operations of the data backup, data recovery and data deletion are respectively described below.

1. Data Backup Operation

In the present exemplary embodiment, when a backup request of the user is received, the storage server 102 divides the original data into a plurality of data segments, and generates the data segment copies according to the number of the peer storage servers in the storage server group. Moreover, the storage server 102 distributes the data segments to the peer storage servers and generates metadata having a segment distribution matrix according to a distribution result.

In detail, the storage server 102 divides the original data into the data segments according to a segment size, and calculates the number of the data segments according to a following formula (1);

$$|P_D|=|D|/L \qquad (1)$$

Wherein, $|P_D|$ represents the number of the data segments of the original data, $|D|$ represents the size of the original data, and L represents the segment size. Here, the segment size can be set according to a bandwidth of network transmission, so as to avoid network congestion.

Moreover, the storage server 102 calculates a redundancy corresponding to each of the data segments according to a minimum survival rate and the number of the peer storage servers.

Here, the minimum survival rate is a ratio predetermined by the user. In detail, since the host storage server dispersedly stores the original data into a plurality of the peer storage servers, each of the peer storage servers preserves a part of the data segments other than all of the data segments, so as to increase the security of the data backup. However, when the host storage server wants to recover the original data, a part of the peer storage servers preserving the data segments are probably not online (i.e., unconnected to the community network system 1). Therefore, the minimum survival rate represents that when the host storage server recovers the original data, as long as an online rate of the original peer storage servers participating the data backup is equal to or greater than the minimum survival rate, the original data can be recovered.

Moreover, the redundancy represents the number of the data segment copies corresponding to each of the data segments. Similarly, when the host storage server recovers the original data, to avoid a situation that a part of the peer storage servers participating backup of the original data is not online (i.e., unconnected to the community network system 1) to influence the data recovery, the storage server 102 generates a plurality of data segment copies for each of the data segments according to the redundancy, and transmits the data segment copies belonged to the same data segment to different peer storage servers for preservation.

In the present exemplary embodiment, the storage server 102 calculates the redundancy according to following formulas (2) and (3):

$$RN_D = ((1 - \min SR_D) \times |F_D|) + 1 \quad (2)$$

$$RN_D < |F_D| \quad (3)$$

Wherein, $RN_D$ is the redundancy, $\min SR_D$ is the minimum survival rate, and $|F_D|$ represents the number of the peer storage servers participating the data backup.

Moreover, the storage server 102 generates the data segment copies according to the number of the data segments, the number of the peer storage servers in the present storage server group and the redundancy, and distributes the generated data segment copies to the peer storage servers participating the data backup according to limitations of following formulas (4) and (5), so as to generate the segment distribution matrix:

$$\bigcup_{\forall f \in F_D} P_D(f) \equiv P_D \quad (4)$$

$$|P_D(f)| < |P_D| \quad (5)$$

Wherein, $F_D$ represents all of the peer storage servers, $P_D(f)$ represents a set of the data segment copies distributed to a f-th peer storage server, $P_D$ represents a set of the data segments corresponding to the original data, $|P_D(f)|$ represents the number of the data segment copies distributed to the f-th peer storage server. Therefore, when the storage server 102 distributes the data segment copies, a set of all of the data segment copies distributed to all of the peer storage servers is equivalent to the set of the data segments corresponding to the original data (i.e., the formula (4)), and the number of the data segment copies distributed to each of the peer storage servers has to be less than the number of the data segments corresponding to the original data.

FIG. 2 is an example of the segment distribution matrix according to the first exemplary embodiment of the disclosure. In this example, it is assumed that all of the storage servers 104, 106, 108, 110, 112 and 114 have been connected to the community network system 1.

In this example, the storage server 102 divides the original data into data segments P1-P12, and the redundancy is calculated to be 4 in case that the minimum survival rate is set to 50%. In this way, the storage server 102 generates 48 data segment copies for the data segments P1-P12 and distributes the 48 data segment copies to 6 peer storage servers. Namely, the storage server 102 generates four data segment copies for each data segment, and the four data segment copies of each data segment are distributed to four peer storage servers.

Referring to FIG. 2, in the segment distribution matrix 190, the generated data segment copies P1(1)-P1(4) of the data segment P1 are sequentially distributed to the storage servers 104, 106, 108 and 110, the generated data segment copies P2(1)-P2(4) of the data segment P2 are sequentially distributed to the storage servers 106, 108, 110 and 112, the generated data segment copies P3(1)-P3(4) of the data segment P3 are sequentially distributed to the storage servers 108, 110, 112 and 114, the generated data segment copies P4(1)-P4(4) of the data segment P4 are sequentially distributed to the storage servers 110, 112, 114 and 108, the generated data segment copies P5(1)-P5(4) of the data segment P5 are sequentially distributed to the storage servers 112, 114, 108 and 110, the generated data segment copies P6(1)-P6(4) of the data segment P6 are sequentially distributed to the storage servers 114, 108, 110 and 112, and the others are deduced by analogy.

Namely, the storage server 102 distributes the data segment copies generated according to the redundancy calculated by the formulas (2) and (3) to the peer storage servers with the limitations that each of the peer storage server does not preserve all of the data segment copies corresponding to the entire original data and the data segment copies are preserved by all of the peer storage servers (i.e., the formulas (4) and (5) are satisfied).

Figure 3:
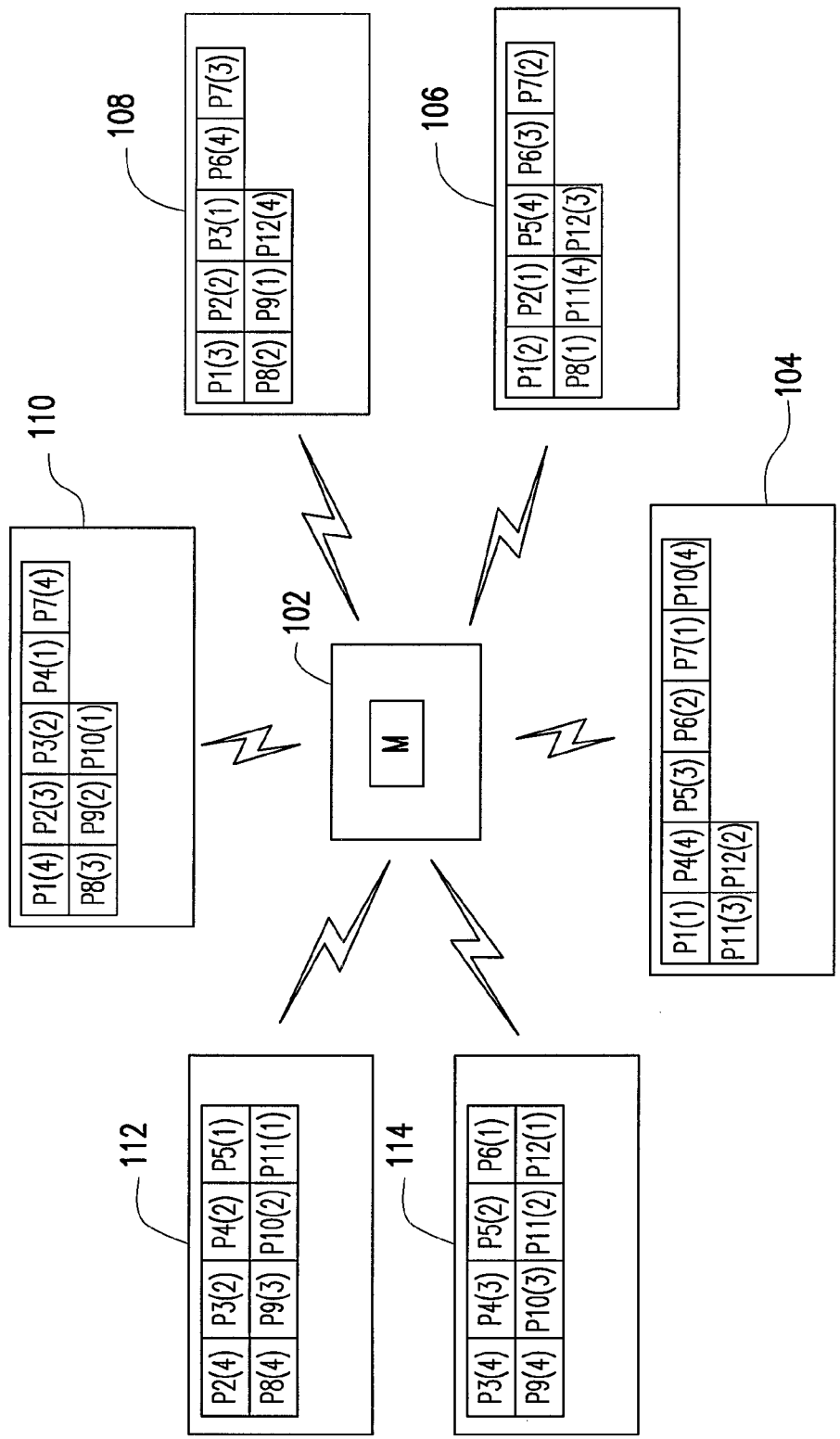
FIG. 3 is a schematic diagram illustrating data preserved in peer storage servers according to the segment distribution matrix of FIG. 2.

FIG. 3 is a schematic diagram illustrating data preserved in the peer storage servers according to the segment distribution matrix of FIG. 2.

Referring to FIG. 3, when the backup request corresponding to the original data is received, the storage server 102 divides the original data into the data segments P1-P12, and transmits the data segment copies (i.e., the data segment copies P1(1)-P1(4) of the data segment P1, the data segment copies P2(1)-P2(4) of the data segment P2, . . . the data segment copies P12(1)-P12(4) of the data segment P12) corresponding to the data segments P1-P12 to the storage servers 104, 106, 108, 110, 112 and 114 for preservation. Moreover, the storage server 102 stores a metadata M.

Figure 4:
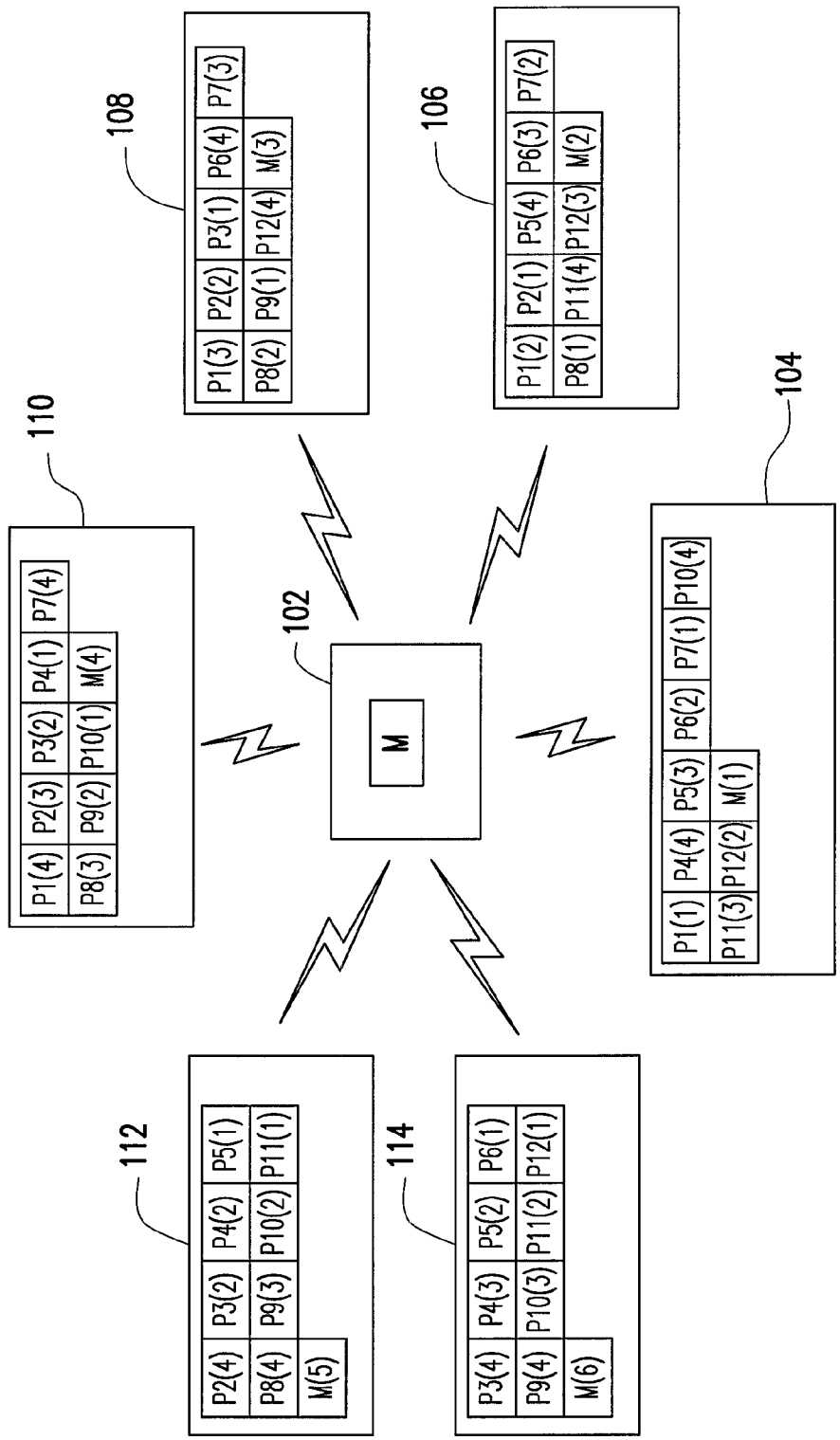
FIG. 4 is a schematic diagram illustrating data preserved in peer storage servers according to another exemplary embodiment of the disclosure.

It should be noticed that in another exemplary embodiment of the disclosure, the host storage server further generates at least one metadata copy for the metadata corresponding to the original data, and selectively transmits the metadata copies to the peer storage servers. For example, the storage server 102 generates the metadata copies M(1)-M(6) according to the metadata M, and transmits the metadata copies M(1)-M(6) to the storage servers 104, 106, 108, 110, 112 and 114 for preservation (as that shown in FIG. 4). In detail, the storage server 102 has to recover the original data according to the metadata M, so that by backing up the metadata M to the storage servers 104, 106, 108, 110, 112 and 114, a situation that the original data cannot be recovered due to lost of the metadata M is avoided.

Moreover, it should be noticed that in another exemplary embodiment of the disclosure, the storage server 102 can also divide the metadata into a plurality of sub-metadata and generate copies corresponding to the sub-metadata for storing in the storage servers 104, 106, 108, 110, 112 and 114. In this way, when the metadata is lost, the storage server 102 can recover the metadata according to the copies of the sub-metadata.

Figure 5:
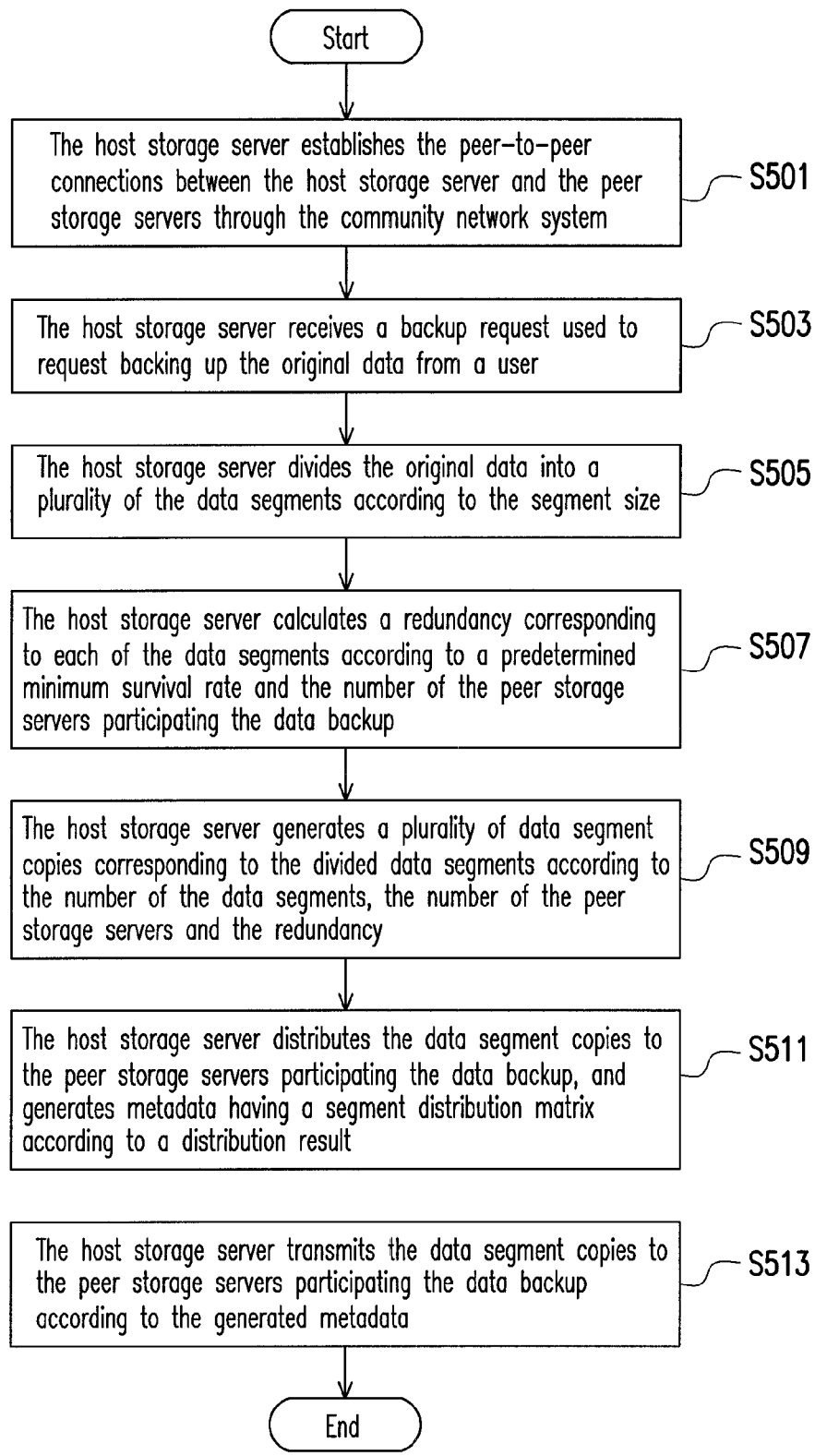
FIG. 5 is a flowchart illustrating a data backup method through a distributed network according to the first exemplary embodiment of the disclosure.

FIG. 5 is a flowchart illustrating a data backup method through a distributed network according to the first exemplary embodiment of the disclosure.

Referring to FIG. 5, first, in step S501, the host storage server (for example, the storage server 102) establishes the peer-to-peer connections between the host storage server and the peer storage servers (for example, the storage servers 104, 106, 108, 110, 112 and 114) through the community network system 1. In detail, when the host storage server is connected to the community network system 1 through an instant communication software, the host storage server sends a format information (which, for example, contains related information such as Internet protocol (IP) addresses used for establishing the peer-to-peer connections) to the storage servers having data backup, recovery and deletion functions of the distributed network according to the friend list. For example, if all of the storage servers 104, 106, 108, 110, 112 and 114 are online, the storage server 102 transmits the format information to the storage servers 104, 106, 108, 110, 112 and 114. Moreover, the storage servers 104, 106, 108, 110, 112 and 114 transmit back related information, so that the storage server 102 can establish the peer-to-peer connections with the storage servers 104, 106, 108, 110, 112 and 114.

In step S503, the host storage server receives a backup request used to request backing up the original data from a user. For example, the original data is transmitted to the host storage server by the user through a network or a data transmission interface (for example, a universal serial bus (USB)), and the user sends the backup request through a data backup operation interface of the host storage server.

Then, in step S505, the host storage server divides the original data into a plurality of data segments according to the segment size. In step S507, the host storage server calculates a redundancy corresponding to each of the data segments according to a predetermined minimum survival rate and the number of the peer storage servers (i.e., the peer storage servers in the present storage server group) participating the data backup.

Next, in step S509, the host storage server generates a plurality of data segment copies corresponding to the divided data segments according to the number of the data segments, the number of the peer storage servers and the redundancy, and in step S511, the host storage server distributes the data segment copies to the peer storage servers participating the data backup, and generates a metadata having a segment distribution matrix according to a distribution result. In the steps S505, S507, S509 and S511, methods of dividing the original data, calculating the redundancy, generating and distributing the data segment copies have been described as above, and therefore detailed descriptions thereof are not repeated.

Finally, in step S513, the host storage server transmits the data segment copies to the peer storage servers participating the data backup according to the generated metadata.

2. Date Recovery Operation

In the present exemplary embodiment, when a recovery request used for recovering the original data backup according to the aforementioned data backup method is received, the host storage sever sends a data recovery request to peer storage servers connected to the community network system 1 (referred to as connected peer storage servers) among the peer storage servers participating the data backup of the original data, and obtains the data segment copies from responded peer storage servers among the connected peer storage servers for recovering the original data.

Generally, the community network system 1 is a non-stop continually operated system, however, according to the above descriptions, the peer storage servers participating the data backup can be offline (i.e., unconnected to the community network system 1) due to various reasons (for example, shutdown or damage). Therefore, the host storage server can only send the data recovery request to the connected peer storage servers. Then, the host storage server receives response messages from the peer storage servers receiving the data recovery request, and determines whether the data segment copies stored in the responded peer storage servers are enough to recover the original data according to the number of the responded peer storage server. If the data segment copies stored in the responded peer storage servers are enough to recover the original data, the host storage server obtains the data segment copies from the responded peer storage servers, so as to recover the original data.

For example, when the storage server 102 receives the recovery request for recovering the original data and the storage servers 104, 106, 108 and 110 are the currently connected peer storage servers, the storage server 102 sends the data recovery request to the connected peer storage servers (i.e., the storage servers 104, 106, 108 and 110) according to online states of the peer storage servers displayed by the community network system 1. After receiving the data recovery request, the storage server 104, 106, 108 and 110 respectively transmit responses corresponding to the data recovery request to the storage server 102. Particularly, the storage server 102 determines whether the original data can be successfully recovered according to whether the number of the responded peer storage servers satisfies a following formula (6):

$$\text{Live}(F_D) \geq (\min SR_D) \times |F_D| \quad (6)$$

Wherein, $\text{Live}(F_D)$ represents the number of the responded peer storage servers.

In detail, as described above, in the present exemplary embodiment, when the original data is backed up, the storage server 102 generates the data segment copies according to the minimum survival rate predetermined by the user. Therefore, when a ratio between the number of the responded peer storage servers and the number of the peer storage servers participating the data backup of the original data is greater than or equal to the predetermined minimum survival rate, the storage server 102 can recover the original data according to the metadata by using the data segment copies obtained from the responded peer storage servers.

For example, in case that the responses of the storage servers 104, 106, 108 and 110 are received, the storage server 102 determines that the number of the peer storage servers participating the data backup of the original data multiplied by the minimum survival rate is 3 (i.e. 6×0.5=3), and determines that the number (i.e., 4) of the responded peer storage server is greater than 3, in this way, the storage server 102 confirms that the data segment copies stored in the responded peer storage servers are enough to recover the original data. Then, the storage servers 102 obtains the data segment copies P1(1), P4(4), P5(3), P6(2), P7(1), P10(4), P11(3) and P12(2) from the storage server 104, obtains the data segment copies P1(2), P2(1), P5(4), P6(3), P7(2), P8(1), P11(4) and P12(3) from the storage server 106, obtains the data segment copies P1(3), P2(2), P3(1), P6(4), P7(3), P8(2), P9(1) and P12(4) from the storage server 108, and obtains the data segment copies P1(4), P2(3), P3(2), P4(1), P7(4), P8(3), P9(2) and P10(1) from the storage server 110. Moreover, the storage server 102 recovers the original data according to the obtained data segment copies.

Figure 6:
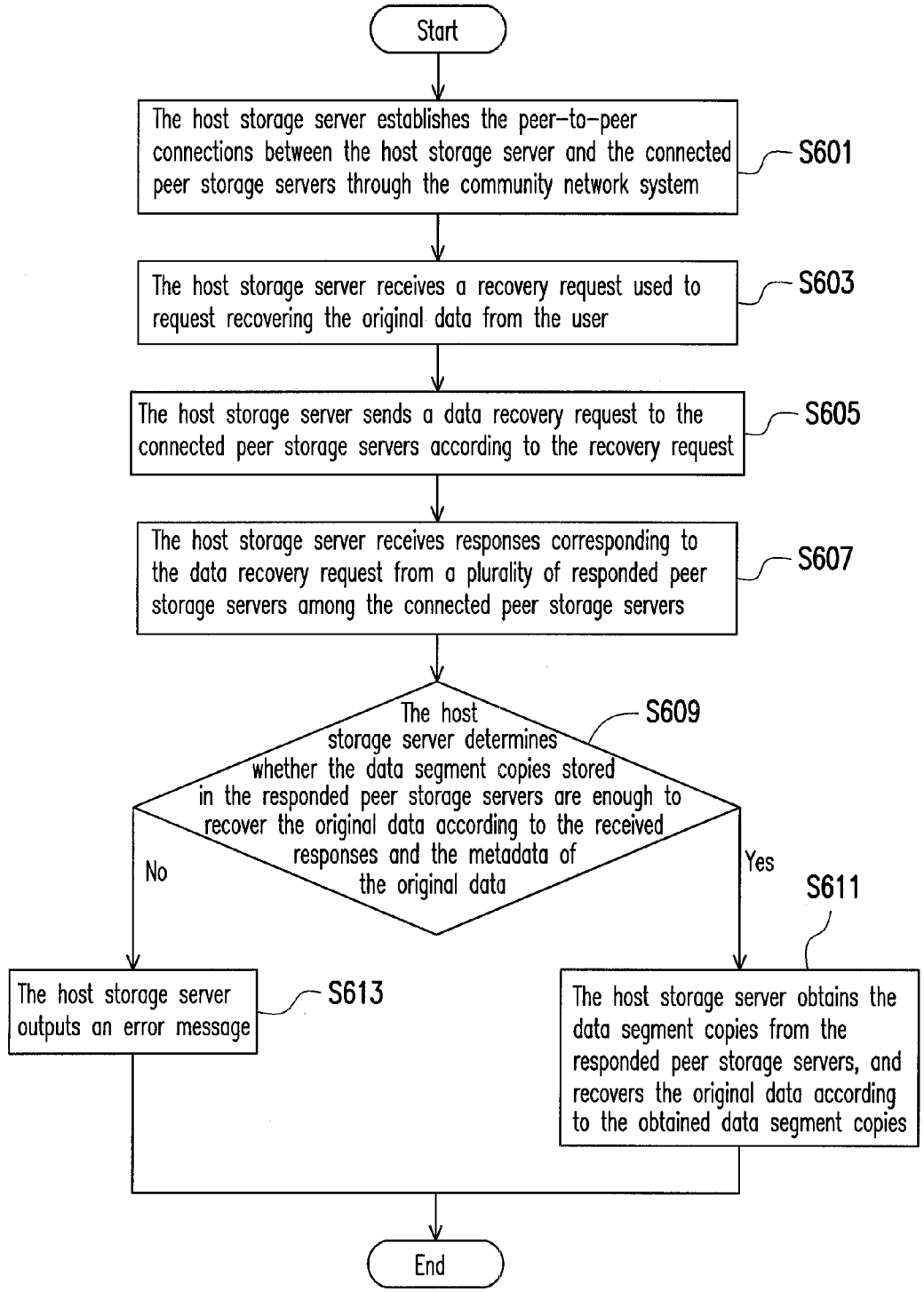
FIG. 6 is a flowchart illustrating a data recovery method through a distributed network according to the first exemplary embodiment of the disclosure.

FIG. 6 is a flowchart illustrating a data recovery method through a distributed network according to the first exemplary embodiment of the disclosure.

Referring to FIG. 6, first, in step S601, the host storage server (for example, the storage server 102) establishes the peer-to-peer connections between the host storage server and the connected peer storage servers through the community network system 1. The connection operation of the step S601 is the same to that of the step S501. However, according to the above description, the peer storage servers participating the data backup may be offline (i.e., unconnected to the community network system 1) due to various reasons (for example, shutdown and damage, etc.), so that the host storage server can only establish the peer-to-peer connections with the connected peer storage servers among the peer storage servers participating the data backup.

In step S603, the host storage server receives a recovery request used to request recovering the original data from the user.

Then, in step S605, the host storage server sends a data recovery request to the connected peer storage servers according to the recovery request. In step S607, the host storage server receives responses corresponding to the data recovery request from a plurality of responded peer storage servers among the connected peer storage servers. In detail, after receiving the data recovery request, the connected peer storage servers can decide to transmit or not to transmit the corresponding responses according to loading states thereof. Namely, if the connected peer storage server does not transmit the response, it does not participate the data recovery procedure.

Then, in step S609, the host storage server determines whether the data segment copies stored in the responded peer storage servers are enough to recover the original data according to the received responses and the metadata of the original data. In detail, in the step S609, the host storage server calculates the number of the responded peer storage servers after waiting a predetermined time period or after receiving the responses of all of the connected peer storage servers, and determines whether the original data can be normally recovered according to the formula (6).

If the data segment copies stored in the responded peer storage servers are enough to recover the original data, in step S611, the host storage server obtains the data segment copies from the responded peer storage servers, and recovers the original data according to the obtained data segment copies. Conversely, if the data segment copies stored in the responded peer storage servers are not enough to recover the original data, in step S613, the host storage server outputs an error message to notify the user that the recover request cannot be completed.

It should be noticed that according to the above description, the host storage server can also transmit the copies of the metadata to the peer storage servers for preservation. Therefore, when the data recovery method is executed, the host storage server further determines whether or not to recover the metadata. If the metadata is required to be recovered (for example, the metadata is lost), the host storage server sends a metadata recovery request to the connected peer storage servers and receives a plurality of sub-metadata copies or a plurality of metadata copies corresponding to the metadata from the connected peer storage servers, so as to recover the metadata corresponding to the original data to be recovered.

3. Data Deletion Operation

In the present exemplary embodiment, after receiving a deletion request used for deleting data backed up according to the aforementioned data backup method. The host storage server sends a backup data deletion request to the connected peer storage servers in the peer storage servers participating the data backup, and receives corresponding responses from the responded peer storage servers to confirm that the data segment copies have been deleted.

Moreover, according to the above description, generally, the community network system 1 is a non-stop continually operated system, however, the peer storage servers participating the data backup can be offline (i.e., unconnected to the community network system 1) due to various reasons (for example, shutdown or damage). Therefore, the host storage server only sends the backup data deletion request to the connected peer storage servers, and records the peer storage servers completing deletion of the backup data. Then, the host storage server further sends the backup data deletion request to the peer storage servers without completing deletion of the backup data at an appropriate time.

For example, the storage server 102 receives the deletion request of the backup data, and the storage servers 104, 106, 108 and 110 are the currently connected peer storage server. The storage server 102 sends the backup data deletion request to the connected peer storage servers (i.e., the storage servers 104, 106, 108 and 110) among the peer storage servers participating the data backup according to online states of the peer storage servers displayed by the community network system 1. After receiving the backup data deletion request, the storage servers 104, 106, 108 and 110 delete the stored data segment copies and transmit corresponding responses to the storage server 102. In this way, the storage server 102 records that the storage servers 104, 106, 108 and 110 have completed deleting the backup data. Regarding the storage server 112, the storage server 102 sends the backup data deletion request to the storage server 112 for requesting deleting the data segment copies stored therein when the storage server 112 is connected to the community network system 1. Particularly, the storage server 102 determines whether the data segment copies stored in all of the peer storage servers are deleted according to the metadata of the original data, and after the data segment copies stored in all of the peer storage servers are deleted, the storage server 102 deletes the metadata corresponding to the original data.

Figure 7:
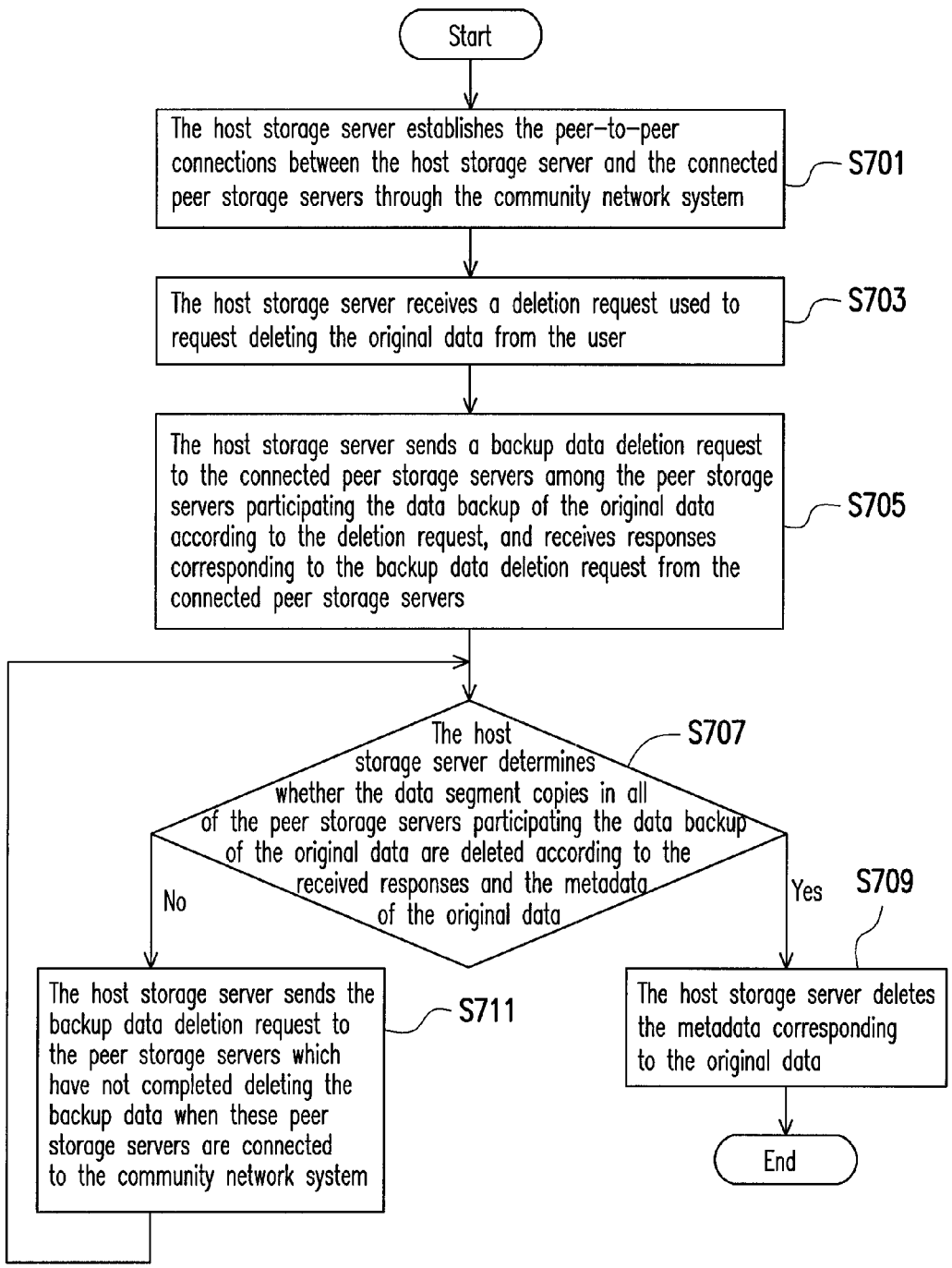
FIG. 7 is a flowchart illustrating a data deletion method through a distributed network according to the first exemplary embodiment of the disclosure.

FIG. 7 is a flowchart illustrating a data deletion method through a distributed network according to the first exemplary embodiment of the disclosure.

Referring to FIG. 7, first, in step S701, the host storage server (for example, the storage server 102) establishes the peer-to-peer connections between the host storage server and the connected peer storage servers through the community network system 1. The connection operation of the step S701 is the same to that of the step S501. However, according to the above description, the peer storage servers participating the data backup may be offline (i.e. unconnected to the community network system 1) due to various reasons (for example, shutdown and damage, etc.), so that the host storage server can only establish the peer-to-peer connections with the connected peer storage servers among the peer storage servers participating the data backup.

In step S703, the host storage server receives a deletion request used to request deleting the original data from the user.

Then, in step S705, the host storage server sends a backup data deletion request to the connected peer storage servers among the peer storage servers participating the data backup of the original data according to the deletion request, and receives responses corresponding to the backup data deletion request from the connected peer storage servers.

Then, in step S707, the host storage server determines whether the data segment copies in all of the peer storage servers participating the data backup of the original data are deleted according to the received responses and the metadata of the original data.

If the data segment copies in all of the peer storage servers participating the data backup of the original data are deleted, in step S709, the host storage server deletes the metadata corresponding to the original data. Conversely, if there are still some peer storage servers participating the data backup of the original data that do not complete deleting the backup data, in step S711, the host storage server sends the backup data deletion request to the peer storage servers which have not completed deleting the backup data when these peer storage servers are connected to the community network system 1, and the step S707 is repeated.

It should be noticed that as described above, the host storage server can also transmit the metadata copies to the peer storage servers for preservation, so that when the above data deletion method is executed, the peer storage server further deletes the stored sub-metadata copies or the metadata copies after deleting the data segment copies.

Second Exemplary Embodiment

Figure 8:
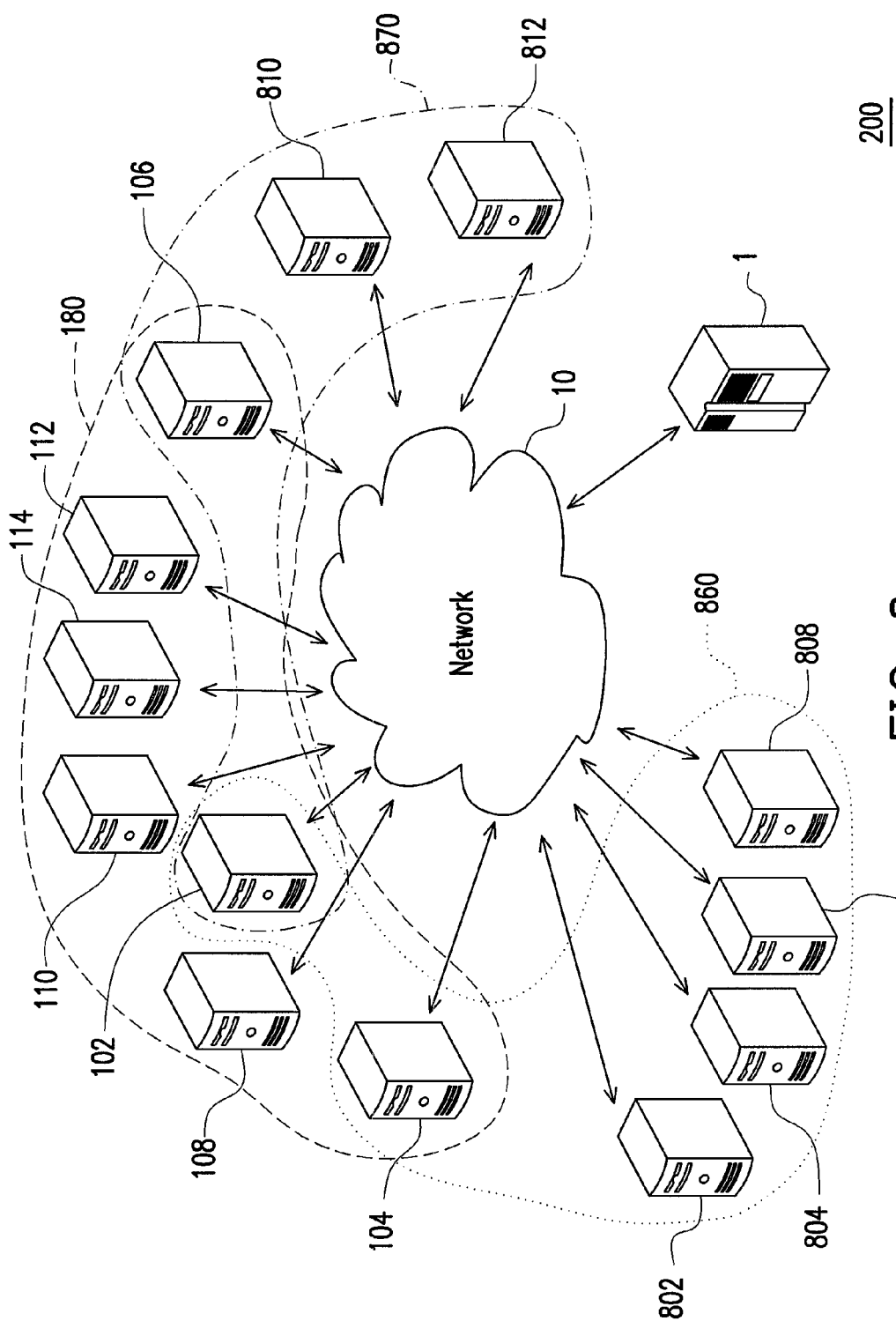
FIG. 8 is a structural diagram illustrating a distributed network system according to a second exemplary embodiment of the disclosure.

FIG. 8 is a structural diagram illustrating a distributed network system according to a second exemplary embodiment of the disclosure.

Referring to FIG. 8, the distributed network system 200 includes a network 10 and storage servers 102, 104, 106, 108, 110, 112, 114, 802, 804, 806, 808, 810 and 812.

The network 10 and the storage servers 102, 104, 106, 108, 110, 112 and 114 of the distributed network system 200 also form the backup network as that does of the first exemplary embodiment, and execute the aforementioned data backup, recovery and deletion methods.

The storage servers 802, 804, 806, 808, 810 and 812 are substantially similar to the storage servers 102, 104, 106, 108, 110, 112 and 114, which can also be connected to the community network system 1. In the second exemplary embodiment, the storage servers 802, 804, 806 and 808 are already in the friend list of the storage server 104, and the storage servers 102, 104, 802, 804, 806 and 808 may form another storage server group 860 based on the storage server 104. Moreover, the storage servers 810 and 812 are already in the friend list of the storage server 106, and the storage servers 102, 106, 810 and 812 may form another storage server group 870 based on the storage server 106.

Particularly, the storage servers 104 and 106 serving as the peer storage servers can further generate sub-data segment copies for the data segment copies received from the storage server 102 serving as the host storage server, and transmit the generated sub-data segment copies to the storage servers 802, 804, 806, 808, 810 and 812 for preservation. In this way, when the storage server 104 or 106 receives the data recovery request and cannot join the data recovery procedure, the storage server 104 or 106 may provide an authorization list so that the storage server 102 can obtain another copy of the data segment copies from the storage servers 802, 804, 806, 808, 810 and 812. Here, the storage servers used for storing the sub-data segment copies generated by the peer storage server are referred to as sub-peer storage servers.

The storage server 104 is taken as an example to describe how the peer storage server further backup the data segment copies to the sub-peer storage servers, how to obtain the sub-data segment copies from the sub-peer storage servers, and how to delete the sub-data segment copies stored by the sub-peer storage servers during the above data backup, data recovery and data deletion operations.

Figure 9:
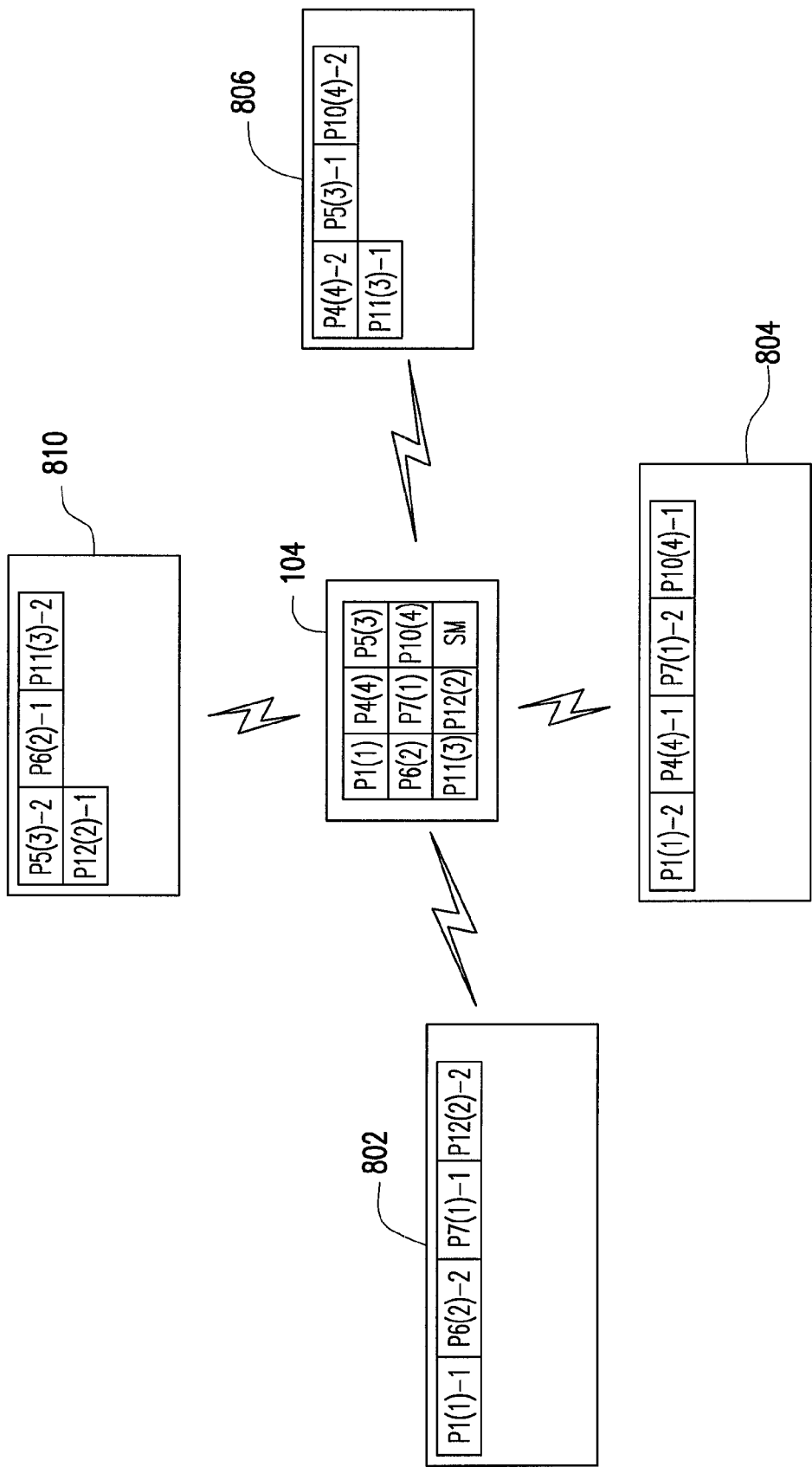
FIG. 9 is a schematic diagram illustrating data preserved in sub-peer storage servers by a peer storage server according to the second exemplary embodiment of the disclosure.

In the present exemplary embodiment, when the storage server 104 participates the backup procedure of the original data performed by the storage server 102 and receives the data segment copies P1(1), P4(4), P5(3), P6(2), P7(1), P10(4), P11(3) and P12(2), the storage server 104 calculates a suitable redundancy according to its predetermined minimum survival rate and the number of the sub-peer storage servers, and generates the sub-data segment copies corresponding to the received data segment copies according to the redundancy. For example, if the minimum survival rate of the storage server 104 is set to 50%, the storage sever 104 generates sub-data segment copies P1(1)-1 and P1(1)-2 corresponding to the data segment copy P1(1), sub-data segment copies P4(4)-1 and P4(4)-2 corresponding to the data segment copy P4(4), sub-data segment copies P5(3)-1 and P5(3)-2 corresponding to the data segment copy P5(3), sub-data segment copies P6(2)-1 and P6(2)-2 corresponding to the data segment copy P6(2), sub-data segment copies P7(1)-1 and P7(1)-2 corresponding to the data segment copy P7(1), sub-data segment copies P10(4)-1 and P10(4)-2 corresponding to the data segment copy P10(4), sub-data segment copies P11(3)-1 and P11(3)-2 corresponding to the data segment copy P11(3), and sub-data segment copies P12(2)-1 and P12(2)-2 corresponding to the data segment copy P12(2). Moreover, the storage server 104 distributes the generated sub-data segment copies to the storage servers 802, 804, 806 and 808 (as that shown in FIG. 9). Similarly, the storage server 104 generates and stores a sub-metadata SM for recording the distribution result.

It should be noticed that in another exemplary embodiment of the disclosure, the storage server 104 can also generate sub-metadata copies for the sub-metadata, and transmit the generated sub-metadata copies to the storage servers 802, 804, 806 and 808. In this way, when the storage server 104 loses the sub-metadata, the storage server 104 can recover the sub-metadata according to the sub-metadata copies stored in the storage servers 802, 804, 806 and 808.

In the present exemplary embodiment, when the storage server 102 sends a data recovery request corresponding to the original data to the storage server 104, and the storage server 104 cannot join the data recovery procedure, the storage server 104 can generate the authorization list according to the sub-metadata. Here, the authorization list records authorization data corresponding to the storage servers 802, 804, 806 and 808, and the storage server 102 can establish peer-to-peer connections with the storage servers 802, 804, 806 and 808 according to the authorization data, so as to obtain the sub-metadata copies.

Moreover, when the storage server 104 receives a backup data deletion request corresponding to the original data from the storage server 102, the storage server 104 deletes the stored data segment copies P1(1), P4(4), P5(3), P6(2), P7(1), P10(4), P11(3) and P12(2) as that described in the first exemplary embodiment, and further sends the backup data deletion request to the storage servers 802, 804, 806 and 808, so as to request deleting the sub-data segment copies P1(1)-1, P1(1)-2, P4(4)-1, P4(4)-2, P5(3)-1, P5(3)-2, P6(2)-1, P6(2)-2, P7(1)-1, P7(1)-2, P10(4)-1, P10(4)-2, P11(3)-1, P11(3)-2, P12(2)-1 and P12(2)-2. Moreover, after all of the storage servers 802, 804, 806 and 808 delete the stored sub-data segment copies, the storage server 104 removes the generated sub-metadata.

In summary, in an actual application of the data backup, recovery and deletion methods provided by the exemplary embodiments of the disclosure, application software is implemented in an embedded system in coordination with a regional storage space, by which besides a system cost is reduced, a more complete network function can also be provided. For example, besides the backup function is provided, a data sharing function is also provided.

In addition, according to the data backup, recovery and deletion methods used in the exemplary embodiments of the disclosure, the metadata is used to establish a backup record. Moreover, the metadata itself is also backed up by the system, so that when the system is damaged, the metadata is first recovered, and then the backup data is recovered according to the metadata, so as to improve the ability of recovering the backup data.

Moreover, according to the data backup, recovery and deletion methods used in the exemplary embodiments of the disclosure, after a user joins the community network system, the user can select a friend group, so that a backup network and space can be naturally formed among the friendly users using the same community network system. Such backup space is voluntarily shared, and an authorization of the original backup provider is still required to access the contents of such space, so that the network backup established according to such concept may increase a security of the backup data.

Moreover, it is time consuming in network transmission to entirely backup a large file, by dividing the large file and analyzing distribution models of the network backup points, the divided data segments can be effectively backed up to various backup points (i.e. the peer storage servers) other than being backed up to only one backup point, so that the data segment copies can be obtained from multiple backup points, so as to increase a file recovery speed. Moreover, since the file is divided into a plurality of data segments, a network transmission load of each backup point can be reduced.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A data backup method through a distributed network, adapted to backup an original data stored in a host storage server by a user, the data backup method comprising:
    establishing a plurality of peer-to-peer connections between the host storage server and a plurality of peer storage servers through a community network system, wherein the host storage server and the peer storage servers are belonged to a storage server group in the community network system;
    receiving a backup request from the user of the host storage server, wherein the backup request is used to request backing up the original data;
    dividing the original data into a plurality of data segments according to a segment size;
    calculating a redundancy corresponding to each of the data segments according to a minimum survival rate and the number of the peer storage servers;
    generating a plurality of data segment copies corresponding to the data segments according to the number of the data segments, the number of the peer storage servers and the redundancy;
    distributing the data segment copies corresponding to the data segments to the peer storage servers and generating a metadata having a segment distribution matrix according to a distribution result; and
    transmitting the data segment copies to the peer storage servers from the host storage server according to the metadata.

2. The data backup method as claimed in claim 1, wherein the number of the data segment copies of each of the data segments is equal to the redundancy, the redundancy is smaller than the number of the peer storage servers, and the data segment copies distributed to any one of the peer storage servers correspond to a portion of the data segments in the segment distribution matrix.

3. The data backup method as claimed in claim 1, further comprising:
    dividing the metadata into a plurality of sub-metadata;
    generating a plurality of sub-metadata copies corresponding to the sub-metadata; and
    transmitting the sub-metadata copies to the peer storage servers.

4. The data backup method as claimed in claim 1, further comprising:
    generating a plurality of metadata copies corresponding to the metadata; and
    transmitting the metadata copies to the peer storage servers.

5. The data backup method as claimed in claim 1, further comprising:
    generating a plurality of sub-data segment copies by one of the peer storage servers, wherein the sub-data segment copies correspond to the data segment copies received by the one of the peer storage servers;
    establishing a plurality of peer-to-peer connections between the one of the peer storage servers and a plurality of sub-peer storage servers through the community network system by the one of the peer storage servers, wherein the one of the peer storage servers and the sub-peer storage servers are belonged to another storage server group in the community network system;
    distributing the sub-data segment copies to the sub-peer storage servers by the one of the peer storage servers, and generating a sub-metadata according to a distribution result of the sub-data segment copies; and
    transmitting the sub-data segment copies to the sub-peer storage servers by the one of the peer storage servers according to the sub-metadata.

6. The data backup method as claimed in claim 5, further comprising:
    generating a plurality of sub-metadata copies corresponding to the sub-metadata by the one of the peer storage servers; and
    transmitting the sub-metadata copies to the sub-peer storage servers by the one of the peer storage servers.

7. The data backup method as claimed in claim 1, wherein the number of the data segments is calculated according to a formula (1):

$$|P_D| = |D|/L \quad (1)$$

wherein $|P_D|$ represents the number of the data segments of the original data, $|D|$ represents a size of the original data, and $L$ represents the segment size,
wherein the step of calculating the redundancy corresponding to each of the data segments according to the minimum survival rate and the number of the peer storage servers comprises calculating the redundancy according to a formula (2), and the redundancy has to satisfy a formula (3):

$$RN_D = ((1 - minSR_D) \times |F_D|) + 1 \quad (2)$$

$$RN_D < |F_D| \quad (3)$$

wherein $RN_D$ is the redundancy, $minSR_D$ is the minimum survival rate, and $|F_D|$ is the number of the peer storage servers.

8. A data recovery method through a distributed network, adapted to recover an original data according to a plurality of data segment copies stored in a plurality of peer storage servers, wherein the original data has a plurality of data segments, and the data segment copies are generated according to the data segments, the data recovery method comprising:

establishing a plurality of peer-to-peer connections between a host storage server and a plurality of connected peer storage servers among the peer storage servers through a community network system;

receiving a recovery request from a user of the host storage server, wherein the recovery request is used to request recovering the original data;

sending a data recovery request to the connected peer storage servers according to the recovery request, wherein the host storage server and the peer storage servers are belonged to a storage server group in the community network system;

receiving a plurality of responses corresponding to the data recovery request from a plurality of responded peer storage servers among the connected peer storage servers and determining whether the data segment copies stored in the responded peer storage servers are enough to recover the original data according to the responses corresponding to the data recovery request; and obtaining the data segment copies stored in the responded peer storage servers and recovering the original data according to a metadata corresponding to the original data by using the obtained data segment copies if the data segment copies stored in the responded peer storage servers are enough to recover the original data.

9. The data recovery method as claimed in claim 8, wherein in a segment distribution matrix of the metadata, the data segment copies corresponding to the data segments are generated according to the number of the data segments, the number of the peer storage servers and a redundancy corresponding to each of the data segments, wherein the redundancy corresponding to each of the data segments is calculated according to a minimum survival rate and the number of the peer storage servers, wherein in the segment distribution matrix, the data segment copies corresponding to the data segments are distributed to the peer storage servers, and the data segment copies distributed to any one of the peer storage servers correspond to a portion of the data segments, wherein the number of the data segment copies of each of the data segments is equal to the redundancy, wherein the redundancy is smaller than the number of the peer storage servers.

10. The data recovery method as claimed in claim 8, wherein the number of the responded peer storage servers satisfies a formula (6):

$$\text{Live}(F_D) \geq (\text{minSR}_D) \times |F_D| \quad (6)$$

wherein $\text{Live}(F_D)$ is the number of the responded peer storage servers, $\text{minSR}_D$ is the minimum survival rate, and $|F_D|$ is the number of the peer storage servers.

11. The data recovery method as claimed in claim 8, further comprising:

determining whether the metadata corresponding to the original data is required to be recovered; and sending a metadata recovery request to the connected peer storage servers if the metadata corresponding to the original data is required to be recovered, and receiving a plurality of sub-metadata copies or a plurality of metadata copies corresponding to the metadata from the connected peer storage servers to recover the metadata corresponding to the original data.

12. The data recovery method as claimed in claim 8, further comprising:

receiving an authorization list form one of the peer storage servers, wherein the one of the peer storage servers generates the authorization list according to a sub-metadata; and obtaining a plurality of sub-data segment copies corresponding to the data segment copies in the one of the peer storage servers from a plurality of sub-peer storage servers according to the authorization list, wherein the one of the peer storage servers establishes a plurality of peer-to-peer connections between the one of the peer storage servers and the sub-peer storage servers through the community network system, and the one of the peer storage servers and the sub-peer storage servers are belonged to another storage server group in the community network system.

13. A data deletion method through a distributed network, adapted to delete a plurality of data segment copies corresponding to an original data from a plurality of peer storage servers, wherein the original data has a plurality of data segments, and the data segment copies are generated according to the data segments, The data deletion method comprising:

receiving a deletion request from a user of a host storage server, wherein the deletion request is used to request deleting the data segment copies corresponding to the original data;

sending a backup data deletion request to the peer storage servers according to a metadata corresponding to the original data through a community network system, wherein the host storage server and the peer storage servers are belonged to a storage server group in the community network system;

receiving a plurality of responses corresponding to the backup data deletion request from the peer storage servers, and determining whether the data segment copies stored in all of the peer storage servers are deleted according to the responses corresponding to the backup data deletion request; and deleting the metadata corresponding to the original data if the data segment copies stored in all of the peer storage servers are deleted.

14. The data deletion method as claimed in claim 13, wherein in a segment distribution matrix of the metadata, the data segment copies corresponding to the data segments are generated according to the number of the data segments, the number of the peer storage servers and a redundancy corresponding to each of the data segments, wherein the redundancy corresponding to each of the data segments is calculated according to a minimum survival rate and the number of the peer storage servers, wherein in the segment distribution matrix, the data segment copies corresponding to the data segments are distributed to the peer storage servers, and the data segment copies distributed to any one of the peer storage servers correspond to a portion of the data segments, wherein the number of the data segment copies of each of the data segments is equal to the redundancy, wherein the redundancy is smaller than the number of the peer storage servers.

15. The data deletion method as claimed in claim 13, further comprising:

sending a sub-backup data deletion request to a plurality of sub-peer storage servers according to a sub-metadata by one of the peer storage servers through a community network system, wherein the one of the peer storage servers and the sub-peer storage servers are belonged to another storage server group in the community network system;

deleting a plurality of sub-data segment copies corresponding to the data segment copies stored in the one of the peer storage server according to the sub-backup data deletion request and transmitting a response corresponding to the sub-backup data deletion request by each of the sub-peer storage servers;

determining whether the sub-data segment copies stored in all of the sub-peer storage servers are deleted according to the responses corresponding to the sub-backup data deletion request by the one of the peer storage servers; and deleting the sub-metadata by the one of the peer storage servers if the sub-data segment copies stored in all of the sub-peer storage servers are deleted.

16. A distributed network system, comprising:
a community network system;
a plurality of peer storage servers; and
a host storage server, wherein the host storage server and the peer storage servers are belonged to a storage server group in the community network system,
wherein the host storage server is configured for receiving a backup request used to request backing up an original data,
wherein the host storage server establishes a plurality of peer-to-peer connections between the host storage server and the peer storage servers through the community network system,
wherein the host storage server divides the original data into a plurality of data segments according to a segment size, calculates a redundancy corresponding to each of the data segments according to a minimum survival rate and the number of the peer storage servers, generates a plurality of data segment copies corresponding to the data segments according to the number of the data segments, the number of the peer storage servers and the redundancy, and distributes the data segment copies corresponding to the data segments to the peer storage servers and generates a metadata having a segment distribution matrix according to a distribution result,
wherein the host storage server transmits the data segment copies to the peer storage servers according to the metadata.

17. The distributed network system as claimed in claim 16, wherein the number of the data segment copies of each of the data segments is equal to the redundancy,
wherein the redundancy is smaller than the number of the peer storage servers,
wherein in the segment distribution matrix, the data segment copies distributed to any one of the peer storage servers correspond to a portion of the data segments.

18. The distributed network system as claimed in claim 16, wherein the host storage server further divides the metadata into a plurality of sub-metadata, generates a plurality of sub-metadata copies corresponding to the sub-metadata, and transmits the sub-metadata copies to the peer storage servers.

19. The distributed network system as claimed in claim 16, wherein the host storage server further generates a plurality of metadata copies corresponding to the metadata, and transmits the metadata copies to the peer storage servers.

20. The distributed network system as claimed in claim 16, wherein one of the peer storage servers generates a plurality of sub-data segment copies corresponding to the data segment copies received by the one of the peer storage servers, and establishes a plurality of peer-to-peer connections between the one of the peer storage servers and a plurality of sub-peer storage servers through the community network system,
wherein the one of the peer storage servers and the sub-peer storage servers are belonged to another storage server group in the community network system,
wherein the one of the peer storage servers distributes the sub-data segment copies to the sub-peer storage servers, and generates a sub-metadata according to a distribution result of the sub-data segment copies,
wherein the one of the peer storage servers transmits the sub-data segment copies to the sub-peer storage servers according to the sub-metadata.

21. The distributed network system as claimed in claim 20, wherein the one of the peer storage servers generates a plurality of sub-metadata copies corresponding to the sub-metadata, and transmits the sub-metadata copies to the sub-peer storage servers.

22. The distributed network system as claimed in claim 16, wherein the number of the data segments is calculated according to a formula (1):

$$|P_D|=|D|/L \tag{1}$$

wherein $|P_D|$ represents the number of the data segments of the original data, $|D|$ represents a size of the original data, and L represents the segment size,
wherein the redundancy is calculated according to a formula (2), and the redundancy has to satisfy a formula (3):

$$RN_D=((1-minSR_D)\times|F_D|)+1 \tag{2}$$

$$RN_D<|F_D| \tag{3}$$

wherein $RN_D$ is the redundancy, $minSR_D$ is the minimum survival rate, and $|F_D|$ is the number of the peer storage servers.

23. A distributed network system, comprising:
a community network system;
a plurality of peer storage servers, wherein the peer storage servers store a plurality of data segment copies corresponding to an original data, the original data has a plurality of data segments, and the data segment copies are generated according to the data segments; and
a host storage server, wherein the host storage server and the peer storage servers are belonged to a storage server group in the community network system,
wherein the host storage server is configured for receiving a recovery request used to request recovering the original data,
wherein the host storage server establishes a plurality of peer-to-peer connections between the host storage server and a plurality of connected peer storage servers in the peer storage servers through a community network system, and sends a data recovery request to the connected peer storage servers,
wherein the host storage server receives a plurality of responses corresponding to the data recovery request from a plurality of responded peer storage servers among the connected peer storage servers, and determines whether the data segment copies stored in the responded peer storage servers are enough to recover the original data according to the responses corresponding to the data recovery request,
if the data segment copies stored in the responded peer storage servers are enough to recover the original data, the host storage server obtains the data segment copies stored in the responded peer storage servers and recovers the original data according to a metadata corresponding to the original data by using the obtained data segment copies.

24. The distributed network system as claimed in claim 23, wherein in a segment distribution matrix of the metadata, the data segment copies corresponding to the data segments are generated according to the number of the data segments, the number of the peer storage servers and a redundancy corresponding to each of the data segments, wherein the redundancy corresponding to each of the data segments is calculated according to a minimum survival rate and the number of the peer storage servers, wherein in the segment distribution matrix, the data segment copies corresponding to the data segments are distributed to the peer storage servers, and the data segment copies distributed to any one of the peer storage servers correspond to a portion of the data segments, wherein the number of the data segment copies of each of the data segments is equal to the redundancy, wherein the redundancy is smaller than the number of the peer storage servers.

25. The distributed network system as claimed in claim 23, wherein the number of the responded peer storage servers satisfies a formula (6):

$$\text{Live}(F_D) \geq (\text{minSR}_D) \times |F_D| \quad (6)$$

wherein $\text{Live}(F_D)$ is the number of the responded peer storage servers, $\text{minSR}_D$ is the minimum survival rate, and $|F_D|$ is the number of the peer storage servers.

26. The distributed network system as claimed in claim 23, wherein the host storage server further determines whether the metadata corresponding to the original data is required to be recovered, wherein if the metadata corresponding to the original data is required to be recovered, the host server further sends a metadata recovery request to the connected peer storage servers and receives a plurality of sub-metadata copies or a plurality of metadata copies corresponding to the metadata from the connected peer storage servers to recover the metadata corresponding to the original data.

27. The distributed network system as claimed in claim 23, wherein one of the peer storage servers generates an authorization list according to a sub-metadata, and transmits the authorization list to the host storage server, wherein the host storage server further obtains a plurality of sub-data segment copies corresponding to the data segment copies in the one of the peer storage servers from a plurality of sub-peer storage servers according to the authorization list, wherein the one of the peer storage servers establishes a plurality of peer-to-peer connections between the one of the peer storage servers and the sub-peer storage servers through the community network system, and the one of the peer storage servers and the sub-peer storage servers are belonged to another storage server group in the community network system.

28. A distributed network system, comprising:
a community network system;
a plurality of peer storage servers, wherein the peer storage servers store a plurality of data segment copies corresponding to an original data, the original data has a plurality of data segments, the data segment copies are generated according to the data segments; and a host storage server, wherein the host storage server and the peer storage servers are belonged to a storage server group in the community network system, wherein the host storage server is configured for receiving a deletion request, wherein the deletion request is used to request deleting the data segment copies corresponding to the original data, wherein the host storage server sends a backup data deletion request to the peer storage servers according to a metadata corresponding to the original data through the community network system, wherein the host storage server receives a plurality of responses corresponding to the backup data deletion request from the peer storage servers, and determines whether the data segment copies stored in all of the peer storage servers are deleted according to the responses corresponding to the backup data deletion request, wherein if the data segment copies stored in all of the peer storage servers are deleted, the host storage server deletes the metadata corresponding to the original data.

29. The distributed network system as claimed in claim 28, wherein in a segment distribution matrix of the metadata, the data segment copies corresponding to the data segments are generated according to the number of the data segments, the number of the peer storage servers and a redundancy corresponding to each of the data segments, wherein the redundancy corresponding to each of the data segments is calculated according to a minimum survival rate and the number of the peer storage servers, wherein in the segment distribution matrix, the data segment copies corresponding to the data segments are distributed to the peer storage servers, and the data segment copies distributed to any one of the peer storage servers correspond to a portion of the data segments, wherein the number of the data segment copies of each of the data segments is equal to the redundancy, wherein the redundancy is smaller than the number of the peer storage servers.

30. The distributed network system as claimed in claim 28, wherein one of the peer storage servers sends a sub-backup data deletion request to a plurality of sub-peer storage servers according to a sub-metadata through a community network system, wherein the one of the peer storage servers and the sub-peer storage servers are belonged to another storage server group in the community network system, wherein each of the sub-peer storage servers deletes a plurality of sub-data segment copies corresponding to the data segment copies stored in the one of the peer storage server according to the sub-backup data deletion request, and transmits a response corresponding to the sub-backup data deletion request, wherein the one of the peer storage servers determines whether the sub-data segment copies stored in all of the sub-peer storage servers are deleted according to the responses corresponding to the sub-backup data deletion request, wherein the one of the peer storage servers deletes the sub-metadata if the sub-data segment copies stored in all of the sub-peer storage servers are deleted.

* * * * *

UNITED STATES PATENT AND TRADEMARK OFFICE
CERTIFICATE OF CORRECTION

PATENT NO. : 8,275,752 B2  
APPLICATION NO. : 12/869758  
DATED : September 25, 2012  
INVENTOR(S) : Chia-Ying Tsai et al.

Page 1 of 1

It is certified that error appears in the above-identified patent and that said Letters Patent is hereby corrected as shown below:

On the Title Page:

The item (73) Assignee's Name

"Industrual Technology Research Institute" should be changed to -- Industrial Technology Research Institute --.

Signed and Sealed this
Twenty-first Day of May, 2013

Teresa Stanek Rea
*Acting Director of the United States Patent and Trademark Office*